US012663314B2

(12) United States Patent
Reed

(10) Patent No.: US 12,663,314 B2
(45) Date of Patent: Jun. 23, 2026

(54) INFRARED SENSOR ASSEMBLY FOR RECEIVING INTERCHANGEABLE LENSES

(71) Applicant: LSI Industries, Inc., Cincinnati, OH (US)

(72) Inventor: Mark Curtis Reed, West Chester, OH (US)

(73) Assignee: LSI Industries, Inc., Cincinnati, OH (US)

( * ) Notice: Subject to any disclaimer, the term of this patent is extended or adjusted under 35 U.S.C. 154(b) by 251 days.

(21) Appl. No.: 18/632,362

(22) Filed: Apr. 11, 2024

(65) Prior Publication Data

US 2024/0377260 A1    Nov. 14, 2024

Related U.S. Application Data

(60) Provisional application No. 63/500,685, filed on May 8, 2023.

(51) Int. Cl.
*G01J 5/04* (2006.01)
*G01J 5/0806* (2022.01)

(52) U.S. Cl.
CPC ............... *G01J 5/04* (2013.01); *G01J 5/0806* (2013.01)

(58) Field of Classification Search
CPC ......... G01J 5/04; G01J 5/0806; G01J 1/0271; G01J 5/0205; G01J 5/045; G01J 5/048; G01J 5/08; G01J 5/0875
(Continued)

(56) References Cited

U.S. PATENT DOCUMENTS 2,394,894 A    2/1946    Burgert et al.
4,428,031 A    1/1984    Mori
(Continued)

FOREIGN PATENT DOCUMENTS

DE         4240395 C2    6/2003
DE    202010002944 U1    5/2010
(Continued)

OTHER PUBLICATIONS

McWong International, Inc., McWong PacWave, Technical Specifications, PSC-BL-I-FM-DC0(-BLE), Bi-level Dimming PIR Sensor, dated Aug. 1, 2019 (4 pages).
(Continued)

*Primary Examiner* — Mohammed A Hasan
(74) *Attorney, Agent, or Firm* — Wood Herron & Evans LLP

(57) ABSTRACT

An infrared sensor assembly for adjusting a light output of a light source is provided. The infrared sensor assembly is configured to be mounted to a substrate and includes a housing that defines a chamber in which an infrared sensor is located. The housing includes a body and a tubular connector projecting from the body. The tubular connector includes at least one external thread that extends proximate to a free open end of the tubular connector. The infrared sensor assembly includes a lens or a lens assembly threadably attached to the tubular connector. The lens or the lens assembly includes a base with an annular groove. The infrared sensor assembly further includes a gasket received within the annular groove of the lens or the lens assembly and an internally threaded locking ring that is configured to be threadably received by the tubular connector to secure the infrared sensor assembly to the substrate. The substrate is configured to be positioned between the threaded locking ring and the lens or the lens housing such that the gasket is
(Continued)

compressed between the substrate and the lens or the lens housing to form a seal therebetween.

21 Claims, 11 Drawing Sheets

(58) Field of Classification Search
USPC ......................................................... 359/827
See application file for complete search history.

(56) References Cited

U.S. PATENT DOCUMENTS

| | | | |
|---|---|---|---|
| 4,604,524 | A | 8/1986 | Kotlicki et al. |
| 4,626,686 | A | 12/1986 | Pompei et al. |
| 4,672,206 | A | 6/1987 | Suzuki et al. |
| 4,880,974 | A | 11/1989 | Yamakawa |
| 4,963,741 | A | 10/1990 | McMullin |
| 5,311,024 | A | 5/1994 | Marman et al. |
| 5,394,209 | A | 2/1995 | Stiepel et al. |
| D375,379 | S | 11/1996 | DiCola et al. |
| 5,790,910 | A | 8/1998 | Haskin |
| D406,598 | S | 3/1999 | Grijalva |
| 6,222,191 | B1 | 4/2001 | Myron et al. |
| 6,273,338 | B1 | 8/2001 | White |
| 6,324,008 | B1 | 11/2001 | Baldwin et al. |
| 6,357,936 | B1 | 3/2002 | Elberbaum |
| 6,376,840 | B1 | 4/2002 | Ko |
| 6,653,939 | B2 | 11/2003 | Galloway |
| 6,755,031 | B2 | 6/2004 | Cho et al. |
| D510,945 | S | 10/2005 | Do |
| 7,053,374 | B2 | 5/2006 | Barone |
| 7,151,457 | B2 | 12/2006 | Riley et al. |
| 7,560,696 | B2 | 7/2009 | Wu et al. |
| D603,438 | S | 11/2009 | Takishima |
| D631,075 | S | 1/2011 | Liu et al. |
| D631,184 | S | 1/2011 | Feng et al. |
| D660,896 | S | 5/2012 | Wong |
| D665,437 | S | 8/2012 | Johnson, Jr. et al. |
| 8,247,770 | B2 | 8/2012 | Fischer |
| D678,598 | S | 3/2013 | Wu et al. |
| 8,530,840 | B2 | 9/2013 | Carberry et al. |
| D715,351 | S | 10/2014 | McKinish |
| 8,947,590 | B2 | 2/2015 | Nunnink |
| 9,029,781 | B2 | 5/2015 | Huang |
| 9,121,760 | B2 | 9/2015 | Cabib et al. |
| D745,074 | S | 12/2015 | Tietze |
| 9,261,409 | B2 | 2/2016 | Crottereau et al. |
| 9,291,506 | B2 | 3/2016 | Cabib et al. |
| 9,305,446 | B1 | 4/2016 | Clinton et al. |
| 9,372,121 | B2 | 6/2016 | Huang |
| 9,438,782 | B2 | 9/2016 | Donaldson |
| D778,332 | S | 2/2017 | Suzuki et al. |
| D778,333 | S | 2/2017 | Takatori |
| D785,691 | S | 5/2017 | Nan |
| 9,885,608 | B2 | 2/2018 | Claytor |
| 10,067,312 | B2 | 9/2018 | Nunnink |
| 10,120,156 | B2 | 11/2018 | Tang et al. |
| 10,143,066 | B2 | 11/2018 | Zhou et al. |
| D863,392 | S | 10/2019 | Okitsu et al. |
| 10,447,904 | B2 | 10/2019 | Iinuma |
| 10,498,933 | B2 | 12/2019 | Nunnink et al. |
| 10,545,039 | B2 | 1/2020 | Lake et al. |
| 10,612,663 | B2 | 4/2020 | Little et al. |
| 10,678,019 | B2 | 6/2020 | Nunnink |
| D900,186 | S | 10/2020 | Hu et al. |
| 10,816,165 | B2 | 10/2020 | McCracken, Jr. et al. |
| D913,821 | S | 3/2021 | Behnke |
| 11,076,075 | B2 | 7/2021 | Leonelli, Jr. |
| 11,115,566 | B2 | 9/2021 | Nunnink et al. |
| D948,591 | S | 4/2022 | Sono et al. |
| 11,366,284 | B2 | 6/2022 | Nunnink et al. |
| D962,320 | S | 8/2022 | Blommé |
| 11,519,784 | B2 | 12/2022 | Tran et al. |
| D975,158 | S | 1/2023 | Sono et al. |
| D1,002,915 | S | 10/2023 | Wang et al. |
| D1,061,288 | S | 2/2025 | Reed |
| D1,061,289 | S | 2/2025 | Reed |
| 2001/0022627 | A1 | 9/2001 | Bernhardt |
| 2003/0024332 | A1* | 2/2003 | Traphagen ........... G01D 11/245 73/866.5 |
| 2008/0089694 | A1* | 4/2008 | Chen .................. H04B 10/1141 398/140 |
| 2008/0100910 | A1 | 5/2008 | Kim et al. |
| 2012/0029393 | A1 | 2/2012 | Lee |
| 2013/0126717 | A1* | 5/2013 | Donce ...................... G02B 7/02 359/827 |
| 2013/0177972 | A1* | 7/2013 | Green .................. G06K 19/067 235/487 |
| 2017/0082495 | A1 | 3/2017 | Myllymäki |
| 2017/0255083 | A1 | 9/2017 | Donaldson |
| 2017/0257577 | A1* | 9/2017 | Woolfenden ........... G02B 7/026 |
| 2018/0023981 | A1* | 1/2018 | Forwerck ................ G01P 1/023 73/866.5 |
| 2019/0316940 | A1 | 10/2019 | Tener |
| 2020/0358931 | A1 | 11/2020 | Jenkinson |
| 2021/0011250 | A1 | 1/2021 | Tang |
| 2021/0156736 | A1 | 5/2021 | Hu |
| 2024/0323503 | A1* | 9/2024 | Blake, III .............. H04N 23/54 |
| 2024/0377260 | A1 | 11/2024 | Reed |

FOREIGN PATENT DOCUMENTS

| | | | |
|---|---|---|---|
| DE | 102012010881 | A1 | 12/2013 |
| EP | 1120763 | B1 | 8/2001 |
| EP | 1441317 | B1 | 12/2005 |
| WO | 2019196537 | A1 | 10/2019 |

OTHER PUBLICATIONS

LSI Industries Inc., AirLink Blue, Motion and Photo Sensor Module, Spec.1051.B.1120, dated Dec. 22, 2020 (2 pages).

LSI Industries Inc., AirLink Blue, Ceiling Motion and Daylight Harvesting Sensor, Spec.2071.A.0421, dated Apr. 29, 2021 (2 pages).

LSI Industries Inc., AirLink Blue, Daylight Harvesting Sensor, Spec.2071.A.0421, dated May 14, 2021 (2 pages).

LSI Industries Inc., AirLink Blue, Control Module, Spec.1052.A.0620, dated May 25, 2021 (1 page).

LSI Industries Inc., AirLink Blue, System Architecture, Spec.1046.B.1120, dated Aug. 6, 2021 (1 page).

LSI Industries Inc., AirLink Blue, Ceiling Motion Sensor, Spec.2072.A.0421, dated Mar. 3, 2022 (2 pages).

LSI Industries Inc., AirLink Blue Specification, dated 2022 (4 pages).

Leviton Manufacturing Co., Inc., Product Data, ZLDxZ-xxx/OFDxZ-xxx, Smart IP66 PIR Integrated Fixture Mount Sensors with Bluetooth(TM) Connectivity and UV Stable Plastic, dated 2022 (6 pages).

"Sensorswitch," published Aug. 15, 2013, retrieved Mar. 11, 2025 from <https://images.thdstatic.com/catalog/pdflmages/c0/c089a0a1-f153-4a14-a281-badf9748f3db.pdf> (Year: 2013).

"Acrylic Dome," first available Dec. 7, 2018, retrieved Mar. 11, 2025 from https://www.amazon.com/dp/B07L6GLTNP (Year: 2018).

* cited by examiner

INFRARED SENSOR ASSEMBLY FOR RECEIVING INTERCHANGEABLE LENSES

CROSS-REFERENCE TO RELATED APPLICATION

This present application claims the filing benefit of U.S. Provisional Application Ser. No. 63/500,685, filed May 8, 2023, the disclosure of which is incorporated herein by reference in its entirety.

FIELD OF THE INVENTION

This invention relates generally to infrared sensing devices and, more particularly, to an infrared sensor assembly for adjusting a light output level of a connected light source.

BACKGROUND OF THE INVENTION

Adjusting the light output level of a light source is a common requirement in many lighting applications. This adjustment is often necessary to ensure the optimal illumination of an area or object, as well as to conserve energy and reduce costs. To enable this adjustment, a variety of technologies have been used in the past, including mechanical switches, dimmer switches, and occupancy sensors.

Infrared (IR) sensors, including passive infrared sensors (PIR), have become increasingly popular in the lighting industry due to their ability to detect the presence of individuals or objects in an area by sensing the heat emitted from their bodies, for example. One or more IR sensors are typically incorporated into an occupancy sensor that is placed in the vicinity of a light source that is connected to the occupancy sensor. The occupancy sensor is configured to adjust the light output level of the connected light source based on the presence of individuals or objects detected by the IR sensor. This technology is highly effective in reducing energy consumption and increasing the lifespan of light sources by avoiding unnecessary use.

A typical occupancy sensor may include a lens to enhance the heat or light signature for the IR sensor by focusing the radiation onto the IR sensor. This allows for increased sensitivity and accuracy in detecting changes in infrared radiation, which is the basis for passive infrared sensing. Overall, the use of lenses is an effective way to enhance the sensitivity and accuracy of the occupancy sensor for a particular lighting application. To that end, different lighting applications often require different lenses.

Traditional occupancy sensors for lighting systems can be limited in their adaptability to receive different lenses, which limits their adaptability to different lighting applications. For example, a traditional occupancy sensor may be provided with a lens that optimizes the sensor for use in one type of lighting environment, such as outdoor lighting or commercial lighting, but not an indoor lighting environment, for example. In that regard, occupancy sensors are typically configured to receive only one type of lens. It is often necessary to procure a different occupancy sensor for each type of lighting application. To this end, traditional occupancy sensors do not provide the ability to easily replace or interchange lenses for different lighting applications.

Therefore, a need exists for an occupancy sensor, otherwise referred to as an IR sensor assembly, that can be easily adapted to different lighting applications to provide a more adaptable and versatile solution for lighting systems. In particular, there is a need for an IR sensor assembly configured to receive a variety of interchangeable lenses to provide a more flexible and adaptable solution for lighting systems that can lead to increased energy efficiency, cost savings, and an improved user experience.

SUMMARY OF THE INVENTION

The present invention overcomes the foregoing and other shortcomings and drawbacks of known IR sensor assemblies for lighting applications. While the invention will be described herein in connection with certain embodiments, it will be understood that the invention is not limited to these embodiments. On the contrary, the invention includes all alternatives, modifications, and equivalents as may be included within the spirit and scope of the invention.

According to one embodiment of the present invention, an infrared sensor assembly configured to be mounted to a substrate is provided. The infrared sensor assembly includes a housing that defines a chamber configured to receive an infrared sensor therein. The housing includes a body and a tubular connector that projects from the body to a free open end of the tubular connector. The tubular connector includes at least one external thread that extends proximate to the free open end. The infrared sensory assembly further includes a lens assembly threadably attached to the tubular connector, the lens assembly including a base having an annular groove, and a gasket received within the annular groove of the lens assembly. The infrared sensory assembly includes an internally threaded locking ring that is configured to be threadably received by the tubular connector to secure the infrared sensor assembly to the substrate. In that regard, the substrate is configured to be positioned between the threaded locking ring and the lens assembly such that the gasket is compressed between the substrate and the lens assembly to form a seal therebetween.

According to one aspect of the present invention, the at least one external thread of the tubular connector may extend to the free open end. For example, the at least one external thread of the tubular connector may extend continuously between the body of the housing and the free open end of the tubular connector.

According to another embodiment of the present invention, the body of the housing may include a back cover removably attached to a back of the body to provide access to the chamber of the housing. Moreover, the body may be configured to house a printed circuit board of the infrared sensor and the tubular connector may be configured to house an infrared sensing element of the infrared sensor.

According to yet another aspect of the present invention, the lens assembly may include a lens and a lens housing. The lens may include a tubular body that extends between a lens portion and an open end to define an infrared receiving chamber. The tubular body may include an external sidewall with at least one external thread that extends proximate to the open end of the tubular body. The lens housing may include a first internally threaded socket being configured to threadably receive the lens and a second internally threaded socket being configured to threadably receive the tubular connector of the infrared sensor assembly housing. In another aspect, the lens assembly further includes a gasket located between a base of the first internally threaded socket and the open end of the lens to form a seal therebetween. In yet another aspect, the lens housing may include a tubular body with the first internally threaded socket formed in the tubular body at a top of the lens housing and the second internally threaded socket formed in a base of the lens housing, and an opening formed in the tubular body that places the first internally threaded socket in communication with the second internally threaded socket. For example, the opening formed in the tubular body of the lens housing may define an annular ledge that is configured to abut the free open end of the tubular connector when the lens housing is threadably attached thereto.

According to another embodiment of the present invention, an infrared sensor assembly configured to be mounted to a substrate is provided. The infrared sensory assembly includes a housing that defines a chamber configured to receive an infrared sensor therein. The housing includes a body and a tubular connector that projects from the body to a free open end of the tubular connector. The tubular connector includes at least one external thread that extends proximate to the free open end. The infrared sensory assembly further includes a lens threadably attached to the tubular connector, the lens including a base having an annular groove, and a gasket received within the annular groove of the lens. The infrared sensory assembly further includes an internally threaded locking ring that is configured to be threadably received by the tubular connector to secure the infrared sensor assembly to the substrate. In that regard, the lens is configured to engage the substrate such that the gasket is compressed between the substrate and the lens assembly to form a seal therebetween.

According to one aspect of the present invention, the at least one external thread of the tubular connector extends to the free open end. For example, the at least one external thread of the tubular connector may extend continuously between the body of the housing and the free open end of the tubular connector.

According to another aspect of the present invention, the body of the housing may include a back cover removably attached to a back of the body to provide access to the chamber of the housing. For example, the body may be configured to house a printed circuit board of the infrared sensor and the tubular connector may be configured to house an infrared sensing element of the infrared sensor.

According to one aspect of the present invention, the lens may include a lens portion and a tubular body that extends between the lens portion and an open end of the lens. In another aspect, the tubular body may include an internally threaded sidewall portion having at least one internal thread that terminates proximate to the open end of the tubular body. The at least one internal thread may be configured to threadably engage the tubular connector. In one aspect, the tubular body may include a non-threaded sidewall portion that extends between the internally threaded sidewall portion of the tubular body and the lens portion. For example, the internally threaded sidewall portion and the non-threaded sidewall portion may be separated by an annular ledge that is configured to abut the free open end of the tubular connector. In one aspect, the non-threaded sidewall portion may include a plurality of internal facets formed circumferentially about the non-threaded sidewall portion.

According to one aspect of the present invention, the lens portion may include a multi-lens portion that includes a plurality of faceted surfaces. For example, the lens portion may include a convex lens portion including a smoothly curved surface.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 2 is an enlarged perspective view of the IR sensor assembly of

FIG. 1.

DETAILED DESCRIPTION OF THE INVENTION

Figure 1:
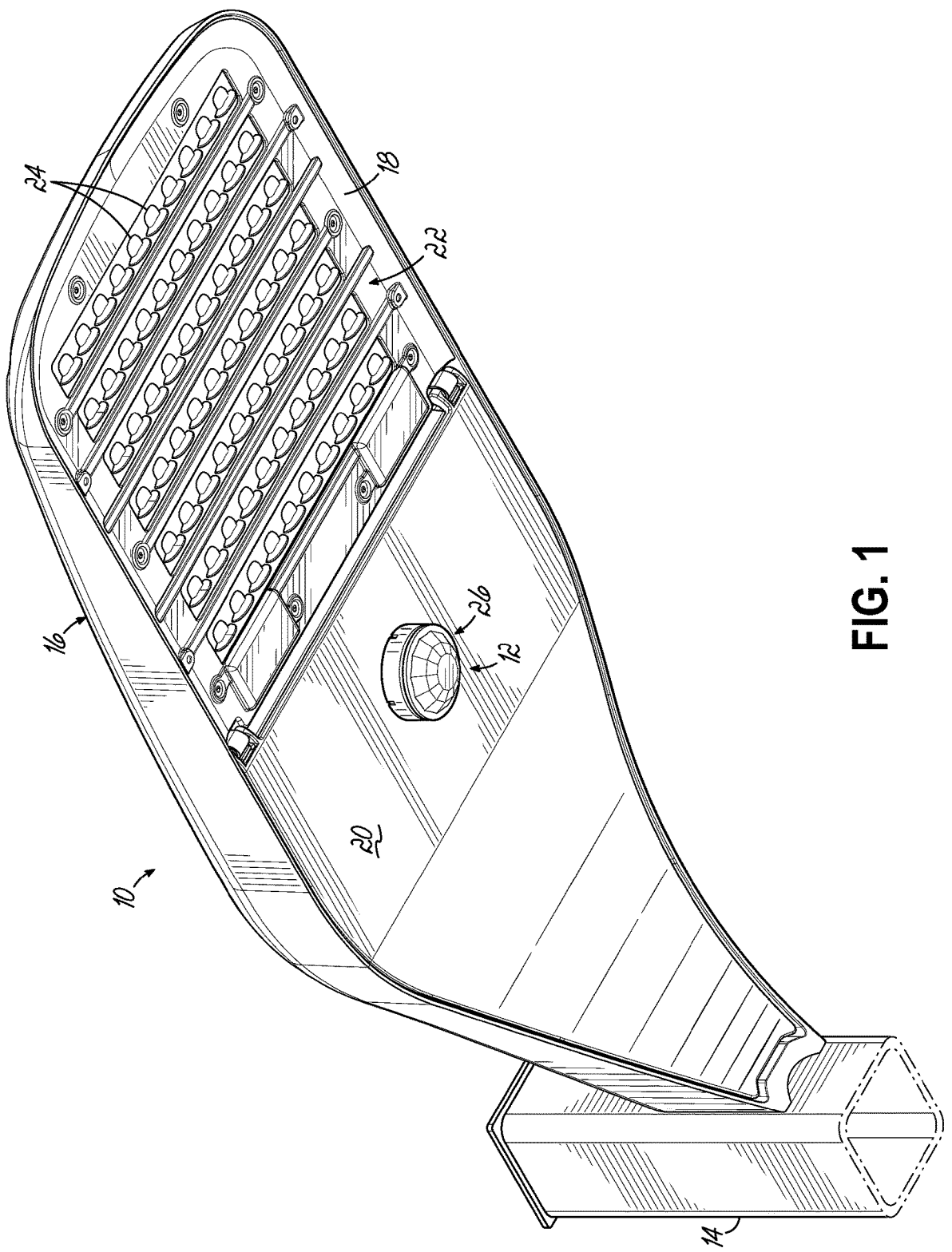
FIG. 1 is a perspective view of a luminaire assembly including an IR sensor assembly according to an embodiment of the present invention.

With reference to the figures, and to FIG. 1 in particular, an exemplary luminaire assembly 10 is shown equipped with an IR sensor assembly 12 for adjusting a light output level of the luminaire assembly 10 according to an exemplary embodiment of the invention. The exemplary luminaire assembly 10 is an outdoor luminaire assembly that is well-suited for street, outdoor parking, or garage lighting, for example. The luminaire assembly 10 is mounted to a pole 14 that supports the luminaire assembly 10 above an area to be illuminated by the luminaire assembly 10. The luminaire assembly 10 further includes a housing 16 with an optical frame 18 and a removable cover 20. While not shown, the housing 16 defines an interior where electrical components for the lighting assembly are located, such as a substrate, a ballast, and other components known by those skilled in the art to operate a luminaire assembly. The interior of the housing 16 may be accessible via the removable cover 20. For example, the cover 20 may be removed to access electrical components in the housing 16. The luminaire assembly 10 further includes a light source 22 housed in the optical frame 18. The light source 22 is downwardly facing to cast light in a downward direction toward an illuminated area. In the embodiment shown, the light source 22 includes a plurality of light emitting diodes (LEDs) 24. The luminaire assembly 10 may be the luminaire assembly described in U.S. Pat. No. 10,816,165 (owned by the Assignee of the present disclosure), the disclosure of which is expressly incorporated herein by reference in its entirety.

Figure 2:
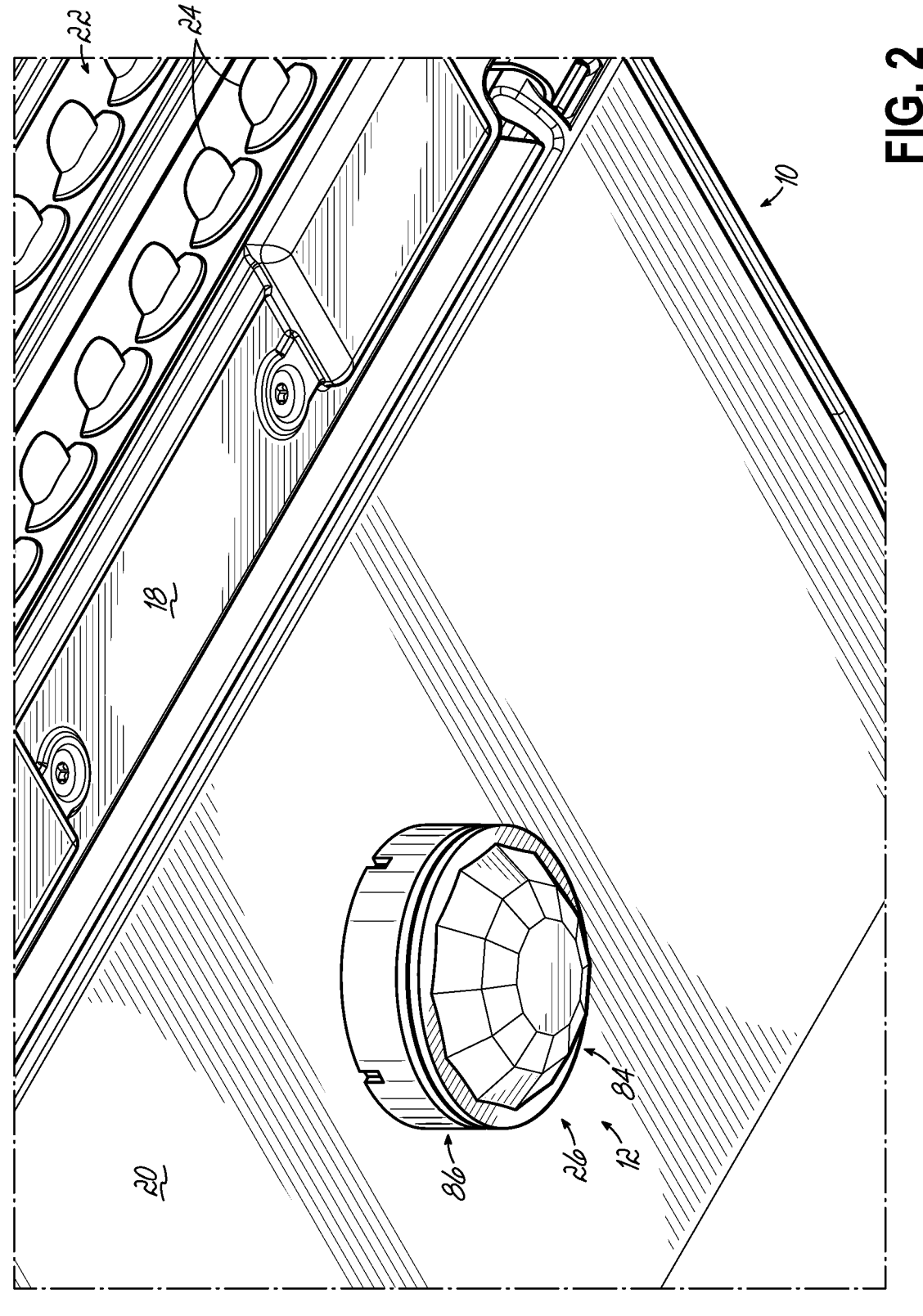

Referring now to FIGS. 1 and 2, the IR sensor assembly 12 is mounted to the housing 16 of the luminaire assembly 10 at a location in the vicinity of the light source 22. In particular, the IR sensor assembly 12 is mounted to the cover 20 of the luminaire assembly 10, adjacent to the optical frame 18 and the light source 22. The IR sensor assembly 12 is mounted to the cover 20 such that a lens assembly 26 of the IR sensor assembly 12 remains exposed from the interior of the luminaire assembly 10. Specifically, the lens assembly 26 is arranged to face in the same downward direction as the light source 22 to detect the presence of radiation, such as IR radiation (i.e., the presence of individuals or objects), in or near the illuminated area. To this end, a detection area of the IR sensor assembly 12 may at least include a portion, or the entirety, of the illuminated area of the luminaire assembly 10. While the figures illustrate the IR sensor assembly 12 in a specific location on the luminaire assembly 10, it will be understood that the IR sensor assembly 12 may be mounted elsewhere in the luminaire assembly 10, and the drawings are not intended to be limiting. Furthermore, while the IR sensor assembly 12 is shown and described in use with a certain type of luminaire assembly 10, it will be understood that the IR sensor assembly may be used with other luminaires. More particularly, in its broader aspects, the inventive concepts related to the IR sensor assembly 12 may be implemented with any luminaire where a light output level of the luminaire is desired to be adjusted. To this end, the exemplary luminaire assembly 10 is not intended to limit the scope of the invention.

The IR sensor assembly 12 is configured to be electrically connected to the electrical components of the luminaire assembly 10 to adjust a light output level of the light source 22. As will be described in further detail below, the IR sensor assembly 12 configured to receive different lenses to accommodate different lighting applications. As a result, the IR sensor assembly 12 is for both indoor and outdoor lighting applications, depending on the type of lens is installed to the IR sensor assembly 12, for example. Thus, while aspects of the IR sensor assembly 12 are shown and described in the context of a specific luminaire assembly, it will be understood that the same inventive concepts related to aspects of the IR sensor assembly 12 may be implemented with different luminaire assemblies for both indoor and outdoor lighting applications without departing from the scope of the invention. More particularly, in its broader aspects, the inventive concepts related to the IR sensor assembly 12 may be implemented in any application that requires adjustment of a light output level of a light source. To this end, the drawings are not intended to be limiting.

Figure 3:
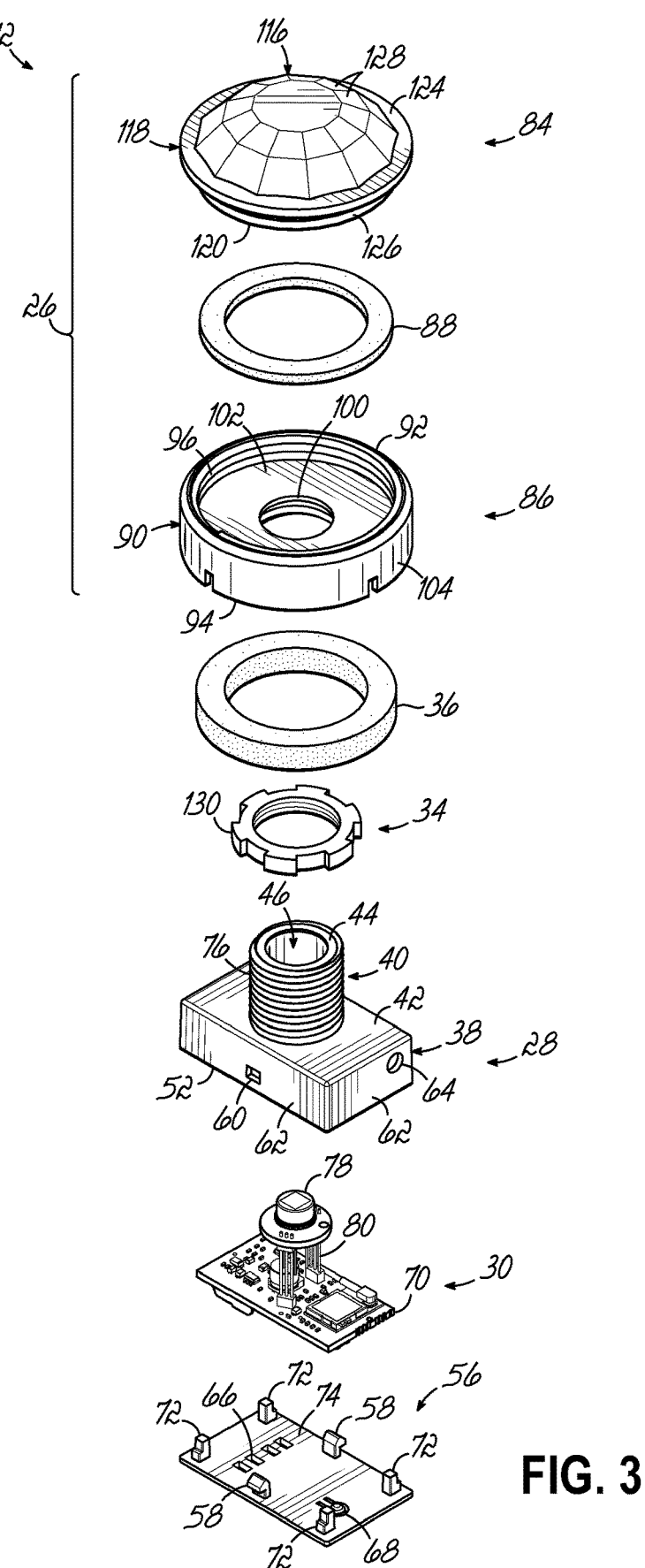
FIG. 3 is an exploded view of the IR sensor assembly of FIGS. 1 and 2, illustrating additional details of the IR sensor assembly.
Figure 4:
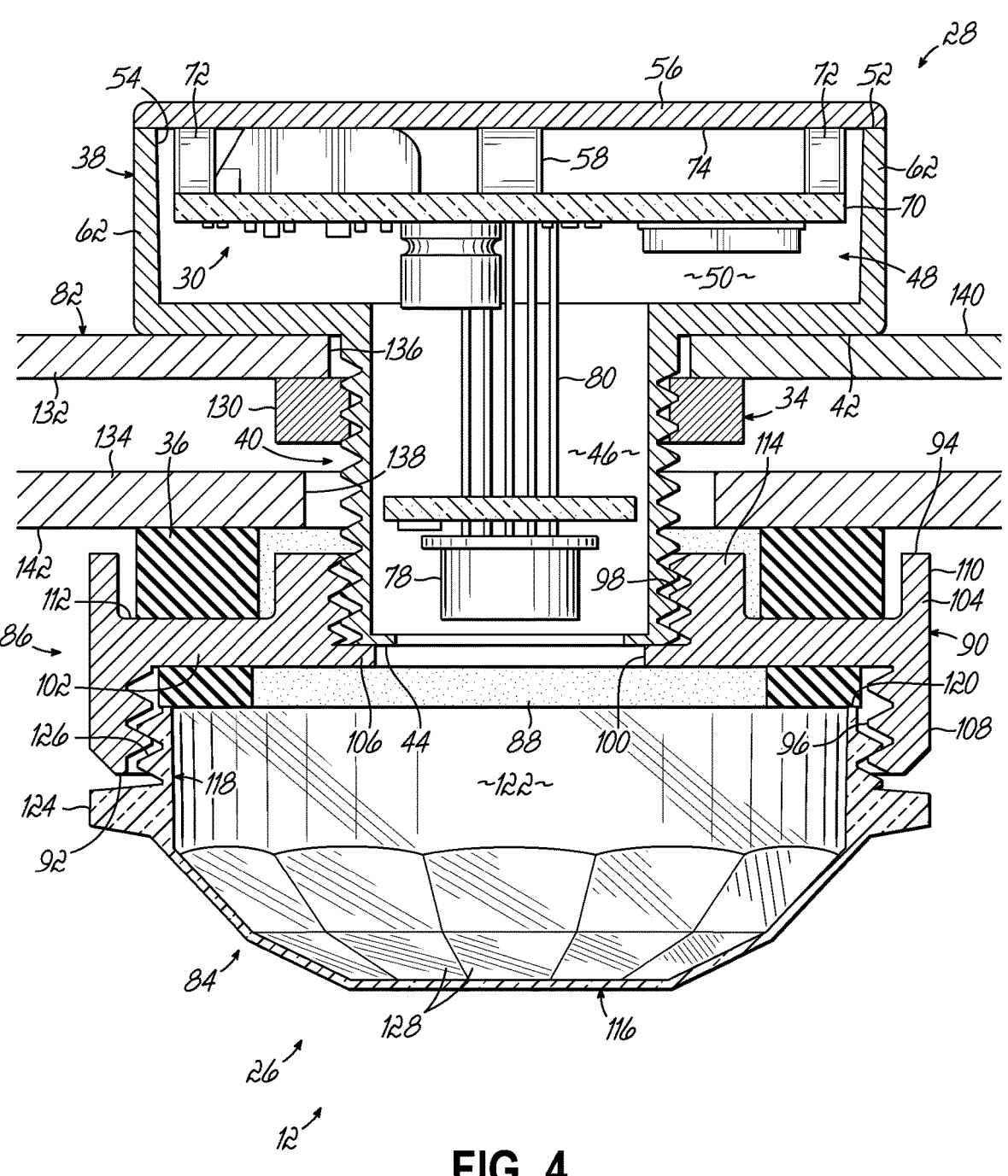
FIG. 4 is a cross-sectional view of the IR sensor assembly, illustrating the IR sensor assembly mounted to a double-walled substrate according to an embodiment of the present invention.

Turning now to FIGS. 3 and 4, details of the IR sensor assembly 12 are shown and will now be described. In that regard, the IR sensor assembly 12 includes the lens assembly 26 and a housing 28 configured to threadably receive the lens assembly 26. The housing 28 is configured to house an IR sensor 30, such as a passive infrared sensor (PIR), for detecting infrared radiation emitted by objects. As will be described in further detail below, the lens assembly 26 is removably attachable to the housing 28 and is configured to focus incoming radiation onto a photosensitive element of the IR sensor 30 to improve the sensitivity of the IR sensor 30 for specific applications. The lens assembly 26 further includes an internally threaded locking ring 34 and a sealing gasket 36. As will be described in further detail below, the internally threaded locking ring 34 facilitates attachment of the IR sensor assembly 12 to a substrate (e.g., the cover 20 of the luminaire assembly 10) and the sealing gasket 36 is configured to form a seal between the IR sensor assembly 12 and the substrate to which it is attached.

With continued reference to FIGS. 3 and 4, the housing 28 includes a body 38 and a tubular connector 40 that projects from a top surface 42 of the body 38 to a free open end 44 of the tubular connector 40. In that regard, the tubular connector 40 defines a passageway 46 that is in communication with an interior 48 of the body 38. The body 38 and tubular connector 40 of the housing 28 together define a chamber 50 that is sized to receive the IR sensor 30. The body 38 of the housing 28 further includes a base 52 that defines an opening 54 to the chamber 50. The housing 28 further includes a back cover 56 that is removably attachable to the base 52 of the body 38 to close the opening 54. To that end, the removable back cover 56 provides selective access to the chamber 50, such as to install or remove the IR sensor 30 therefrom, for example. Thus, the back cover 56 provides access to the inside of the housing 28 and is further used to enclose the IR sensor 30 within the housing 28. The back cover 56 includes one or more locking features 58, such as spring clips, configured to engage with corresponding openings 60 formed in sidewalls 62 of the body 38 of the housing 28 to secure the back cover 56 to the housing 28. The spring clips 58 may be disengaged from the openings 60 by hand, for example, so that the back cover 56 may be removed from the housing 28. The sidewalls 62 of the body 38 of the housing 28 may include one or more apertures 64 through which wiring may be routed, for example.

The back cover 56 may further include one or more slots 66 which provide access to certain wire terminals within the housing 28 for wire removal, for example. The back cover 56 may include a tab 68, such as a push button, for engaging a printed circuit board (PCB) 70 of the IR sensor 30. For example, the tab 68 may be depressed to engage a switch on the PCB 70 to reset or to turn on/off the IR sensor 30. The back cover 56 further includes a number of support pegs 72 arranged on an inner surface 74 of the back cover 56 for supporting the IR sensor 30. In particular, the support pegs 72 are configured to receive the PCB 70 of the IR sensor 30. The support pegs 72 may space the IR sensor 30, and in particular the PCB 70, away from the inner surface 74 of the back cover 56 and to a central position within the body 38 of the housing 28.

With continued reference to FIGS. 3 and 4, the tubular connector 40 is configured to threadably receive components of the IR sensor assembly 12, such as the internally threaded locking ring 34 and the lens assembly 26. In that regard, the tubular connector 40 extends from the body 38 of the housing 28 to the free open end 44 to define a longitudinal length of the tubular connector 40. The tubular connector 40 includes at least one external thread 76 that extends along the length of the tubular connector 40. In the embodiment shown, the at least one external thread 76 extends continuously along the length of the tubular connector 40. In particular, the at least one external thread 76 extends along the entire length of the tubular connecter 40 between the top surface 42 of the body 38 of the housing 28 and the free open end 44 of the tubular connector 40. However, in an alternative embodiment, the at least one external thread 76 may have a length that is less than the length of the tubular connector 40. For example, the at least one external thread 76 may terminate along the tubular connector 40 at a location that is spaced away from free open end 44 such that a portion of the tubular connector 40 adjacent to the free open end 44 is unthreaded. Additionally or alternatively, the at least one external thread 76 may terminate along the tubular connector 40 at a location that is spaced away from the top surface 42 of the body 38 of the housing 28 such that a portion of the tubular connector 40 adjacent to the top surface 42 of the body 38 of the housing 28 is unthreaded.

The IR sensor 30 includes the PCB 70, an IR sensing element 78 (otherwise referred to as an IR detector or IR receiver) which includes a photosensitive element for detecting infrared radiation, and other components known by those skilled in the art to operate the IR sensor 30, such as an amplifier that amplifies the signal generated by the IR sensing element 78 and a signal processing circuit that interprets the signal. The IR sensing element 78 is electrically connected to the PCB 70 with one or more electrical connectors in the form of input/output pins 80. The input/output pins 80 are rigid and position the IR sensing element 78 above surfaces of the PCB 70. To this end, the IR sensing element 78 is spaced a distance away from the PCB 70 by the input/output pins 80. As will be described in further detail below, when the IR sensor 30 is installed within the housing 28 of the IR sensor assembly 12, the input/output pins 80 are sized to position the IR sensing element 78 within the passageway 46 of the tubular connector 40.

FIG. 4 illustrates the IR sensor assembly 12 assembled and mounted to a substrate 82 (e.g., the cover 20 of the luminaire assembly 10). As shown, the IR sensor 30 is arranged within the housing 28 of the IR sensor assembly 12. In particular, the PCB 70 is attached to the back cover 56 of the housing 28 which is attached to the body 38 of the housing 28 to enclose and support the IR sensor 30 within the chamber 50 of the housing 28. In that regard, the body 38 of the housing 28 is sized to receive the PCB 70 of the IR sensor 30 and the tubular connector 40 is sized to receive the IR sensing element 78. The input/output pins 80 extend from the PCB 70, which is located in the interior 48 of the body 38 of the housing 28, and into the passageway 46 defined by the tubular connector 40 to locate the IR sensing element 78 proximate to the free open end 44 of the tubular connector 40. The IR sensing element 78 is arranged centrally within the passageway 46 of the tubular connector 40 and may be coaxially arranged with the tubular connector 40. While the IR sensing element 78 is located proximate to the free open end 44 of the tubular connector 40, the IR sensing element 78 may be recessed slightly into the passageway 46 and away from the free open end 44 of the tubular connector 40 to form a small gap or space between the IR sensing element 78 and the free open end 44 of the tubular connector 40. To this end, the location of the IR sensing element 78 within the tubular connector 40 may be varied to achieve a desired focal length for a given application (i.e., a distance between a lens of the lens assembly 26 and the IR sensing element 78), for example.

Referring again to FIGS. 3 and 4, the lens assembly 26 includes a lens 84, which may be a Fresnel lens, and a lens housing 86 to which the lens 84 is configured to be attached. The lens assembly 26 further includes a housing gasket 88 that is configured to form a seal between the lens 84 and the lens housing 86. The lens housing 86 includes a tubular body 90 that extends from a first side or top 92 of the lens housing 86 to an opposite second side or base 94 of the lens housing 86. The lens housing 86 includes a first internally threaded socket 96 formed in the top 92 of the tubular body 90 lens housing 86 and an opposite second internally threaded socket 98 formed in the base 94 the tubular body 90 lens housing 86. The first internally threaded socket 96 is configured to threadably receive the lens 84 and the second internally threaded socket 98 is configured to threadably receive the tubular connector 40 of the housing 28 of the IR sensor assembly 12, as will be described in further detail below.

The lens housing 86 further includes an opening 100 formed in the tubular body 90 that places the first internally threaded socket 96 in communication with the second internally threaded socket 98. The opening 100 is formed at a center of the tubular body 90 so as to be coaxially arranged with the first internally threaded socket 96 and the second internally threaded socket 98. The tubular body 90 includes a plate-like annular flange 102 of the tubular body 90 that extends radially outwardly from the centrally formed opening 100 to a vertically oriented peripheral rim 104 that encircles the annular flange 102. As can be seen in FIG. 4, for example, a diameter of the opening 100 is smaller compared to an inner diameter of the second internally threaded socket 98 such that a portion of the annular flange 102 forms an annular ledge 106.

With continued reference to FIGS. 3 and 4, a first portion 108 of the peripheral rim 104 that extends between the flange 102 and the top 92 of the tubular body 90 is internally threaded to define an annular sidewall of the first internally threaded socket 96. An opposite, second portion 110 of the peripheral rim 104 that extends from the flange 102 to the base 94 of the tubular body 90 is defined by an annular groove 112 formed in the base 94 of the tubular body 90 of the lens assembly 12. The annular groove 112 extends circumferentially about the second internally threaded socket 98 to define an annular sidewall 114 of the second internally threaded socket 98.

With continued reference to FIGS. 3 and 4, the lens assembly 26 further includes the lens 84 which is removably attachable to the lens housing 86. In particular, the lens 84 is threadably attachable to the first internally threaded socket 96 of the lens housing 86. The lens 84 is configured to focus the incoming IR radiation onto the IR sensing element 78 of the IR sensor 30 to improve the sensitivity of the IR sensor 30 for a desired lighting application, for example. In that regard, the lens 84 includes a lens portion, being a multi-lens portion 116, and a tubular body 118 that extends between the multi-lens portion 116 and an open end 120 of the lens 84. Together, the multi-lens portion 116 and the tubular body 118 define an IR receiving chamber 122 of the lens 84. The tubular body 118 of the lens 84 includes a flange 124 that extends about a periphery of the tubular body 118. The flange 124 may be gripped to install or remove the lens 84 from the lens housing 86, for example. The flange 124 may further operate as a stop to prevent over-tightening of the lens 84 to the lens housing 86.

The tubular body 118 includes an externally threaded sidewall 126 having at least one external thread that extends between the flange 124 and the open end 120 of the lens 84. In particular, the at least one external thread extends continuously for an entire length of the sidewall 126. However, in an alternative embodiment, the at least one external thread may terminate along the sidewall 126 of the tubular body 118 at a location that is spaced away from free open end 120 such that a portion of the external sidewall 126 of the tubular body 118 that is adjacent to the free open end 120 is unthreaded. Additionally or alternatively, the at least one thread may terminate along the sidewall 126 of the tubular body 118 at a location that is spaced away from flange 124 such that a portion of the external sidewall 126 of the tubular body 118 that is adjacent to the flange 124 is unthreaded.

The multi-lens portion 116 and the tubular body 118 of the lens 84 are formed together such that the lens 84 is a unitary piece. In that regard, the lens 84 may be formed from optical grade plastic, such as acrylic, polycarbonate, or Polyvinyl chloride (PVC), for example. The multi-lens portion 116 includes a plurality of faceted surfaces 128 of different shapes and sizes that are designed to refract the incoming IR radiation in a way that brings it to a focal point within the lens assembly 26 and onto the IR sensing element 78. By concentrating the IR radiation onto the IR sensing element 78, the IR sensor 30 is able to generate a stronger electrical signal in response to the incoming radiation, which can be used to make more accurate measurements for a given lighting application, for example. To this end, the radiation received by the lens assembly 26 is diffracted as it passes through the lens 84. The diffracted radiation then passes through the IR receiving chamber 122 and to the IR sensing element 78 of the IR sensor 30.

The lens assembly 26 further includes the housing gasket 88 which is configured to form a seal between the lens 84 and the lens housing 86 to prevent the ingress of contaminates, such as water or dust, into the lens assembly 26, the lens 84, and the housing 28 of the IR sensor assembly 12. In that regard, the housing gasket 88 is shaped as a flattened annular disc having generally flat upper and lower surfaces. As shown in FIG. 4, the housing gasket 88 is configured to be received within the first internally threaded socket 96 and placed into engagement with surfaces of the flange 102 of the tubular body 90 (otherwise referred to as a base of the first internally threaded socket 96). An outer diameter of the housing gasket 88 may be similar to, or slightly less than, an inner diameter of the first internally threaded socket 96, for example. An inner diameter of the housing gasket 88 is larger than the opening 100 formed in the flange 102 of the tubular body 90. Threadably attaching the lens 84 to the first internally threaded socket 96 of the lens housing 86 results in the housing gasket 88 being sandwiched between the open end 120 of the lens 84 and the flange 102 of the lens housing 86 to form a seal therebetween.

As briefly described above, the IR sensor assembly 12 includes the internally threaded locking ring 34 and the sealing gasket 36. The internally threaded locking ring 34 is configured to be threadably received by the tubular connector 40 of the housing 28 to secure the housing 28 to the substrate 82 to which the IR sensor assembly 12 is attached, as shown in FIG. 4, for example. The internally threaded locking ring 34 may include a number of projections 130 distributed about its periphery, as shown in FIG. 3. The projections 130 may be engaged by a tool or otherwise improve the gripability of the internally threaded locking ring 34 for installation or removal of the internally threaded locking ring 34 to or from the tubular connector 40.

The sealing gasket 36 is configured to be positioned between the lens assembly 26 and the substrate 82 to which the IR sensor assembly 12 is mounted to form a seal therebetween, as shown in FIG. 4, for example. In particular, the sealing gasket 36 is sandwiched between the lens housing 86 and the substrate 82 to prevent the ingress of contaminates, such as water or dust, between the IR sensor assembly 12 and the substrate 82. In that regard, the sealing gasket 36 is shaped as a flattened annular disc having generally flat upper and lower surfaces. As shown in FIG. 4, the sealing gasket 36 is sized to be received within annular groove 112 formed in the base 94 of the tubular body 90 of the lens housing 86 and placed into engagement with the flange 102 of the tubular body 90. Threadably attaching the lens assembly 26 to the tubular connector 40 of the housing 28 results in the sealing gasket 36 being sandwiched between the substrate 82 and the flange 102 of the lens housing 86 to form a seal therebetween.

Having now described certain details of the IR sensor assembly 12, the process of assembling and attaching the IR sensor assembly 12 to the substrate 82 will now be described. With reference to FIG. 4, the substrate 82 may include an inner wall 132 and an outer wall 134. The inner wall 132 may be a support plate within the interior of the housing 16 of the luminaire assembly 10 described above with respect to FIGS. 1-2, for example, and the outer wall 134 may be the cover 20, for example. As shown, the inner wall 132 and the outer wall 134 of the substrate 82 include openings 136, 138, respectively, that are aligned to receive the tubular connector 40 of the housing 28 of the IR sensor assembly 12 therethrough. To this end, the openings 136, 138 may be the same or different in size.

The housing 28 of the IR sensor assembly 12 may first be attached to the inner wall 132 of the substrate 82 with the internally threaded locking ring 34. In that regard, the tubular connector 40 is received through the opening 136 in the inner wall 132 such that the top surface 42 of the housing 28 is placed into engagement with the inner wall 132. The internally threaded locking ring 34 may then be threaded to the tubular connector 40 and into engagement with the inner wall 132 to secure the housing 28 thereto, as shown. When so positioned, the internally threaded locking ring 34 may seal closed the opening 136 in the inner wall 132.

Once the housing 28 of the IR sensor assembly 12 has been secured to the inner wall 132 of the substrate 82, the outer wall 134 of the substrate 82 may be moved in place (i.e., the cover 20 secured to the housing 16 of the luminaire assembly 10) such that the exposed portion of the tubular connector 40 is positioned through the opening 138 in the outer wall 134. When so positioned, a portion of the tubular connector 40, and in particular the free open end 44 of the tubular connector 40, is exposed from the substrate 82. The lens assembly 26, with the sealing gasket 36 arranged in the annular groove 112, may then be threaded to the exposed portion of the tubular connector 40. Specifically, the exposed portion of the tubular connector 40 is threadably received within the second internally threaded socket 98 of the lens housing 86. The lens assembly 26 is threaded onto the tubular connector 40 until the free open end 44 of the tubular connector 40 abuts the ledge 106 defined by the opening 100 in the lens housing 86. The threaded engagement between the lens assembly 26 and the tubular connector 40 of the housing 28 compresses the sealing gasket 36 between the lens housing 86 and the outer wall 134 of the substrate 82 to form a seal therebetween. To this end, the seal formed by the sealing gasket 36 prevents the ingress of contaminates into or past the substrate 82 via the opening 138 in the outer wall 134.

When the IR sensor assembly 12 is assembled to the substrate 82, as shown in FIG. 4, the lens assembly 26, the tubular connector 40 of the housing 28, and the IR sensing element 78 of the IR sensor 30 are coaxial. In that regard, the lens 84 is configured to focus or direct incoming radiation into the free open end 44 of the tubular connector 40 and onto the IR sensing element 78. As shown, the housing 28 of the IR sensor assembly 12 remains on a first side 140 of the substrate 80, defined by the inner wall 132, with the lens assembly 26 being located on a second side 142 of the substrate 82, defined by the outer wall 134. The first side 140 of the substrate 82 may face the interior of the luminaire assembly 10 described above while the second side 142 of the substrate 82 may face the exterior, such as the illuminated area, for example. To that end, the body 38 of the housing 28 of the IR sensor assembly 12 may be located in the interior of the luminaire assembly 10 while the lens assembly 26 is external to the luminaire assembly 10.

Figure 4A:
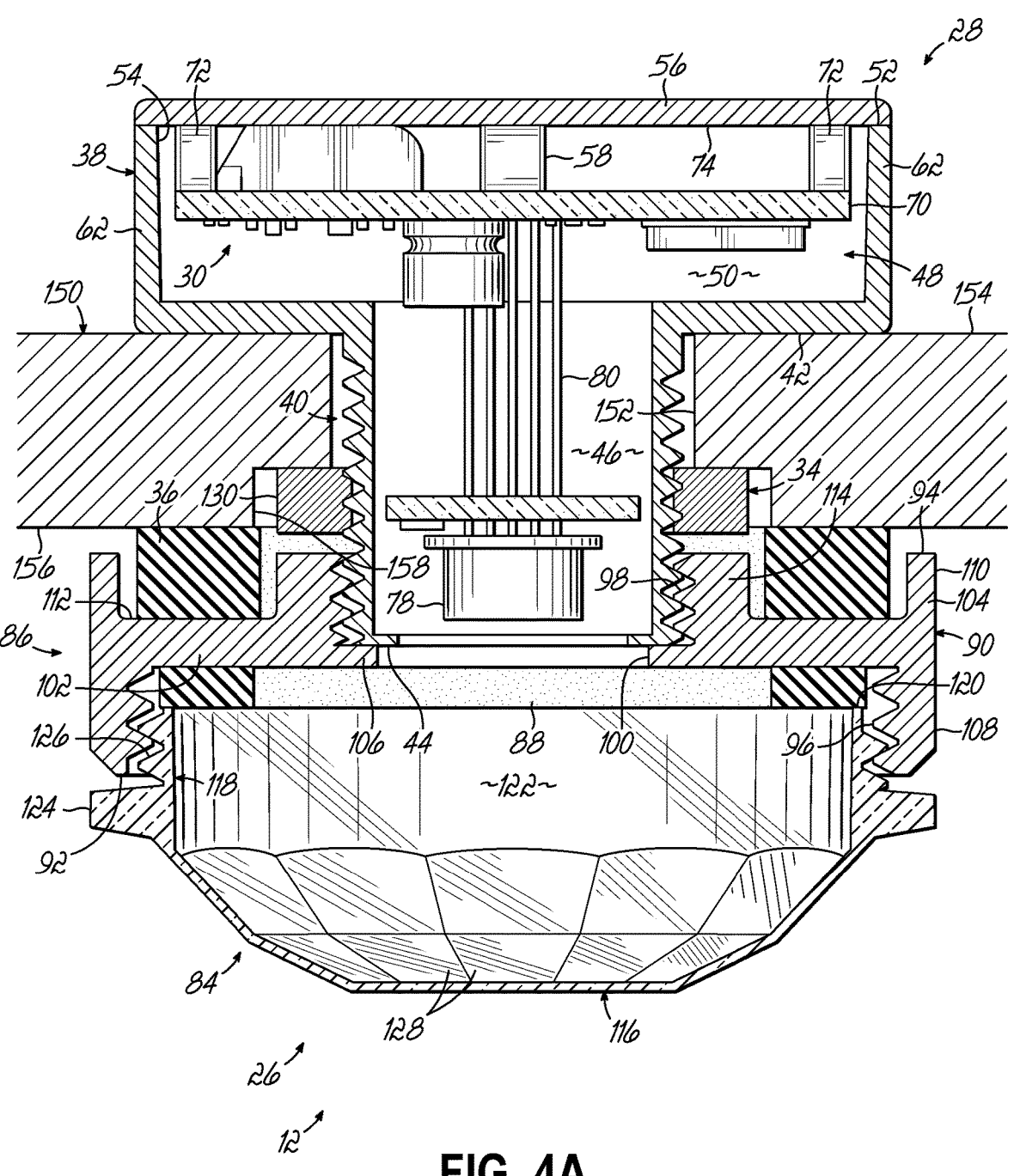
FIG. 4A is a cross-sectional view of the IR sensor assembly, illustrating the IR sensor assembly mounted to a single-walled substrate according to an embodiment of the present invention.

FIG. 4A illustrates the IR sensor assembly 12 is attached to a substrate 150 that comprises a single wall in accordance with another embodiment of the invention. As shown, the substrate 150 includes an opening 152 through which the tubular connector 40 is configured to be positioned. The substrate 150 may be the cover 20 of the luminaire assembly 10 described above with respect to FIGS. 1-2, for example. In that regard, the substrate 150 includes a first side 154 which may face an interior of the luminaire assembly 10 and a second side 156 that is configured to face the exterior, such as the illuminated area, for example. To this end, the opening 152 includes a counterbore 158 formed in the second side 156 of the substrate 150.

With continued reference to FIG. 4A, the housing 28 of the IR sensor assembly 12 is attached to the substrate 150 with the internally threaded locking ring 34. In that regard, the tubular connector 40 is received through the opening 152 in the substrate 82 such that the top surface 42 of the housing 28 is placed into engagement with the first side 154 of the substrate 150. The internally threaded locking ring 34 is threaded to the tubular connector 40 and into engagement with the second side 156 of the substrate 150 to secure the housing 28 thereto. Specifically, the internally threaded connector 34 is received into the counterbore 158 formed in the second side 156 of the substrate 150, as shown. When so positioned, the internally threaded locking ring 34 may seal closed the opening 152 in the substrate 150.

The lens assembly 26 may then be threadably connected to the portion of the tubular connector 40 exposed from the opening 152 on the second side 156 of the substrate 150. In that regard, the exposed portion of the tubular connector 40 is threadably received within the second internally threaded socket 98 of the lens housing 86. The lens assembly 26 is threaded onto the tubular connector 40 until the free open end 44 of the tubular connector 40 abuts the ledge 106 defined by the opening 100 in the lens housing 86. The threaded engagement between the lens assembly 26 and the tubular connector 40 of the housing 28 compresses the sealing gasket 36 between the lens housing 86 and the second side 156 of the substrate 150 to form a seal therebetween. To this end, the seal formed by the sealing gasket 36 prevents the ingress of contaminates into the opening 152 in substrate 150.

While the substrate 150 in FIG. 4A is shown with a counterbore 158 that is configured to receive the externally threaded locking ring 34, it will be understood that the substrate 150 may not include the counterbore 158. In that regard, an axial thickness of the sealing gasket 36 may be changed to form the seal between the lens housing 86 and the second side 156 of the substrate 150. For example, the sealing gasket 36 may have a greater axial thickness (i.e., a thickness measured between the flattened upper and lower surfaces of the sealing gasket 36), compared to that shown in FIG. 4A, to accommodate for the externally threaded locking ring 34.

Figure 5:
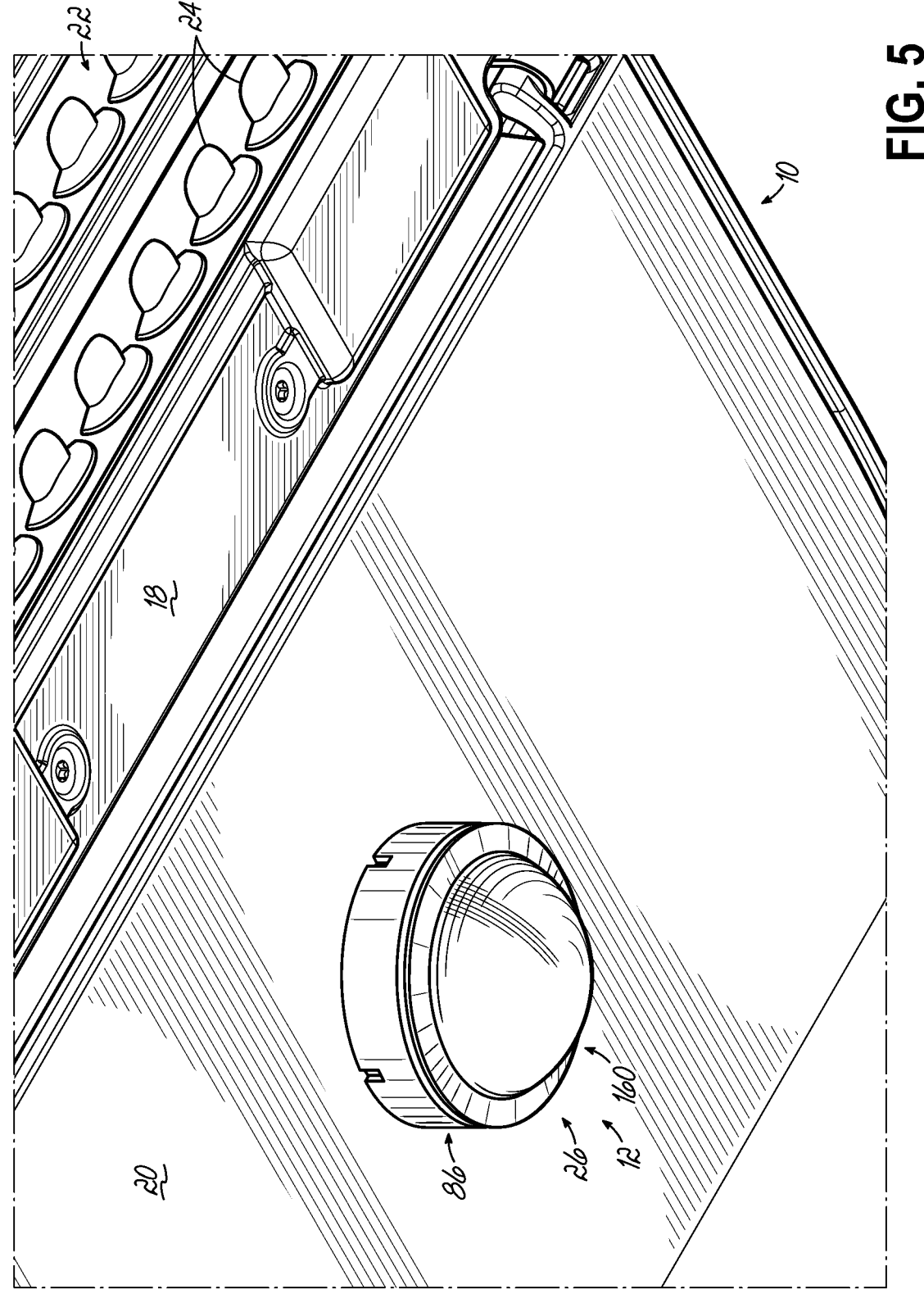
FIG. 5 is a perspective view of an IR sensor assembly according to another embodiment of the present invention, illustrating the IR sensor assembly mounted to the luminaire assembly of FIG. 1.
Figure 6:
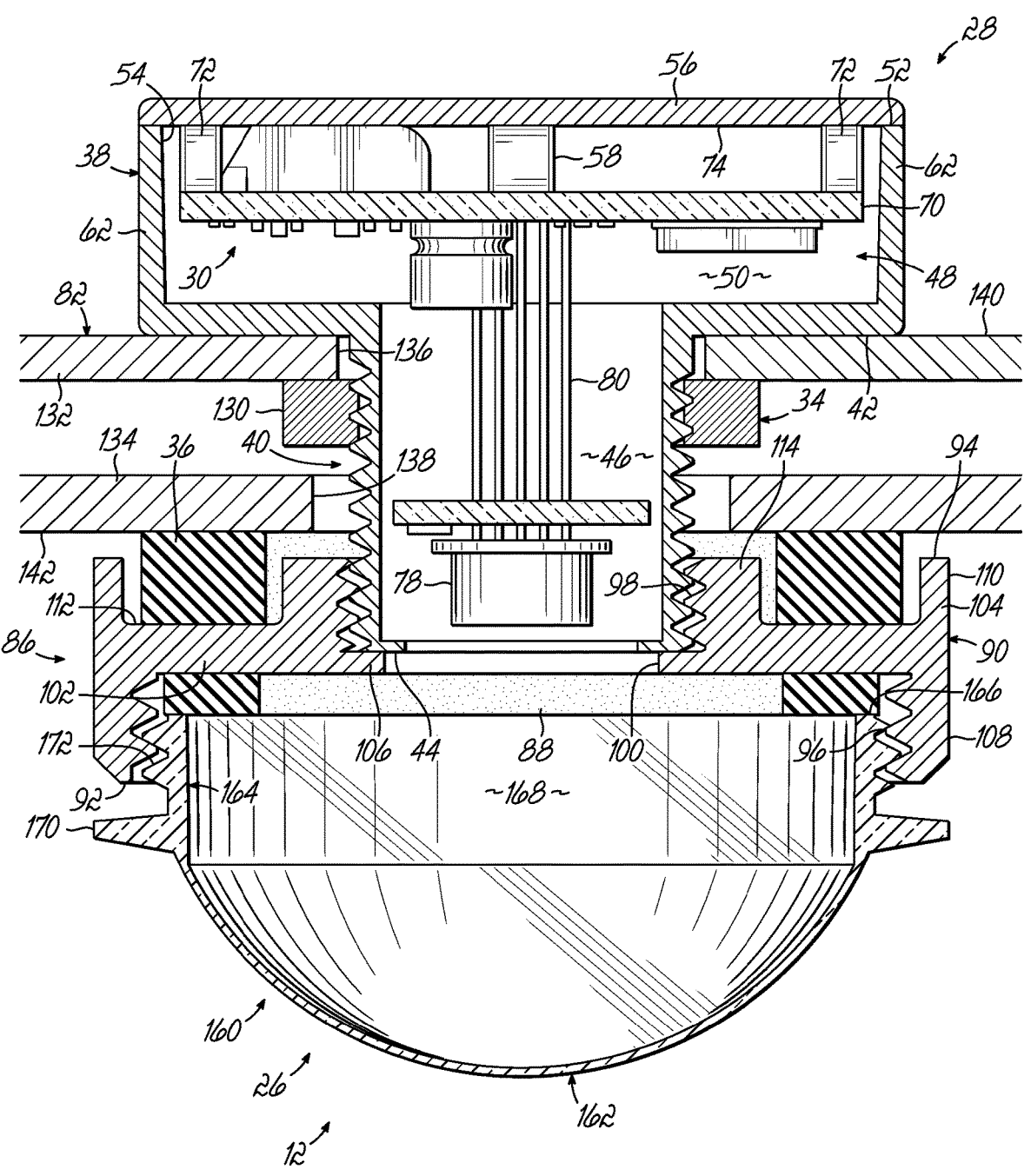
FIG. 6 is a cross-sectional view of the IR sensor assembly of FIG. 5, illustrating the IR sensor assembly mounted to a double-walled substrate according to an embodiment of the present invention.

Referring now to FIGS. 5 and 6, wherein like numerals represent like features compared to embodiments described above with respect to FIGS. 1-4, another embodiment of the IR sensor assembly 12 is shown and will now be described. The primary differences between the IR sensor assembly 12 of this embodiment and the IR sensor assembly 12 of the previously described embodiment is the configuration of a lens 160 of the lens assembly 26. Accordingly, the lens 160 will be the focus of the following description. FIG. 5 illustrates the IR sensor assembly 12 mounted to a substrate, being housing 16 of the luminaire assembly 10 described above. In particular, the IR sensor assembly 12 is mounted to the cover 20 of the luminaire assembly 10, adjacent to the optical frame 18 and the light source 22. The IR sensor assembly 12 is mounted to the cover 20 such that the lens assembly 26 of the IR sensor assembly 12 remains exposed from the interior of the luminaire assembly 10, as shown.

With reference to FIGS. 5 and 6, the lens 160 is threadably attachable to the first internally threaded socket 96 of the lens housing 86. The lens 160 is configured to focus the incoming IR radiation onto the IR receiving element 78 of the IR sensor 30 to improve the sensitivity of the IR sensor 30 for a desired lighting application, for example. In that regard, the lens 160 includes a lens portion, being a convex lens portion 162, and a tubular body 164 that extends between the convex lens portion 162 and an open end 166 of the lens 160. Together, the convex lens portion 162 and the tubular body 164 define an IR receiving chamber 168 of the lens 160. The tubular body 164 of the lens 160 includes a flange 170 that extends about a periphery of the tubular body 164. The flange 170 may be gripped to install or remove the lens 160 from the lens housing 86, for example. In another embodiment, the flange 170 may further operate as a stop to prevent over-tightening of the lens 160 to the lens housing 86.

The tubular body 164 of the lens 160 includes an externally threaded sidewall 172 having at least one external thread that extends between the flange 170 and the open end 166 of the tubular body 164. In particular, the at least one external thread extends continuously for an entire length of the sidewall 172. However, in an alternative embodiment, the at least one external thread may terminate along the sidewall 172 of the tubular body 164 at a location that is spaced away from free open end 166 such that a portion of the sidewall 172 of the tubular body 164 that is adjacent to the free open end 166 is unthreaded. Additionally or alternatively, the at least one thread may terminate along the sidewall 172 of the tubular body 164 at a location that is spaced away from flange 170 such that a portion of the sidewall 172 of the tubular body 164 that is adjacent to the flange 170 is unthreaded.

The convex lens portion 162 and the tubular body 164 of the lens 160 are formed together such that the lens 160 is a unitary piece. In that regard, the lens 160 may be formed from optical grade plastic, such as acrylic, polycarbonate, or Polyvinyl chloride (PVC), for example. The convex lens portion 162 is defined by a smoothly curved or arcuate surface that is configured to refract the incoming IR radiation in a way that brings it to a focal point within the lens assembly 26 and onto the IR sensing element 78. Like the embodiment described above with respect to FIGS. 1-4, the lens assembly 26 further includes the housing gasket 88 that is configured to form a seal between the lens 160 and the lens housing 86. To this end, FIG. 6 illustrates the IR sensor assembly 12 assembled to the exemplary substrate 82 in the same manner as described above with respect to FIGS. 1-4.

Figure 7:
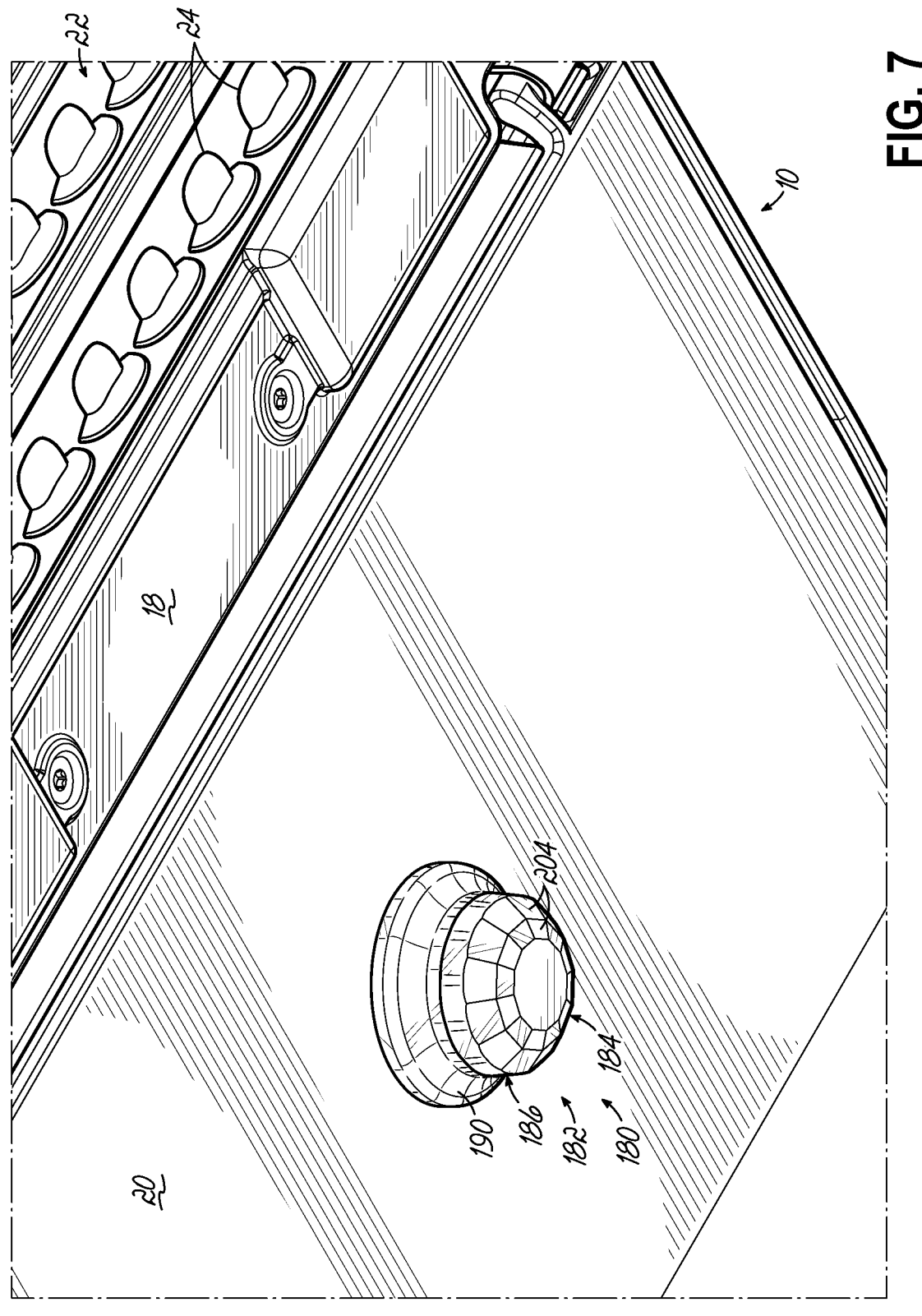
FIG. 7 is a perspective view of an IR sensor assembly according to another embodiment of the present invention, illustrating the IR sensor assembly mounted to the luminaire assembly of FIG. 1.
Figure 8:
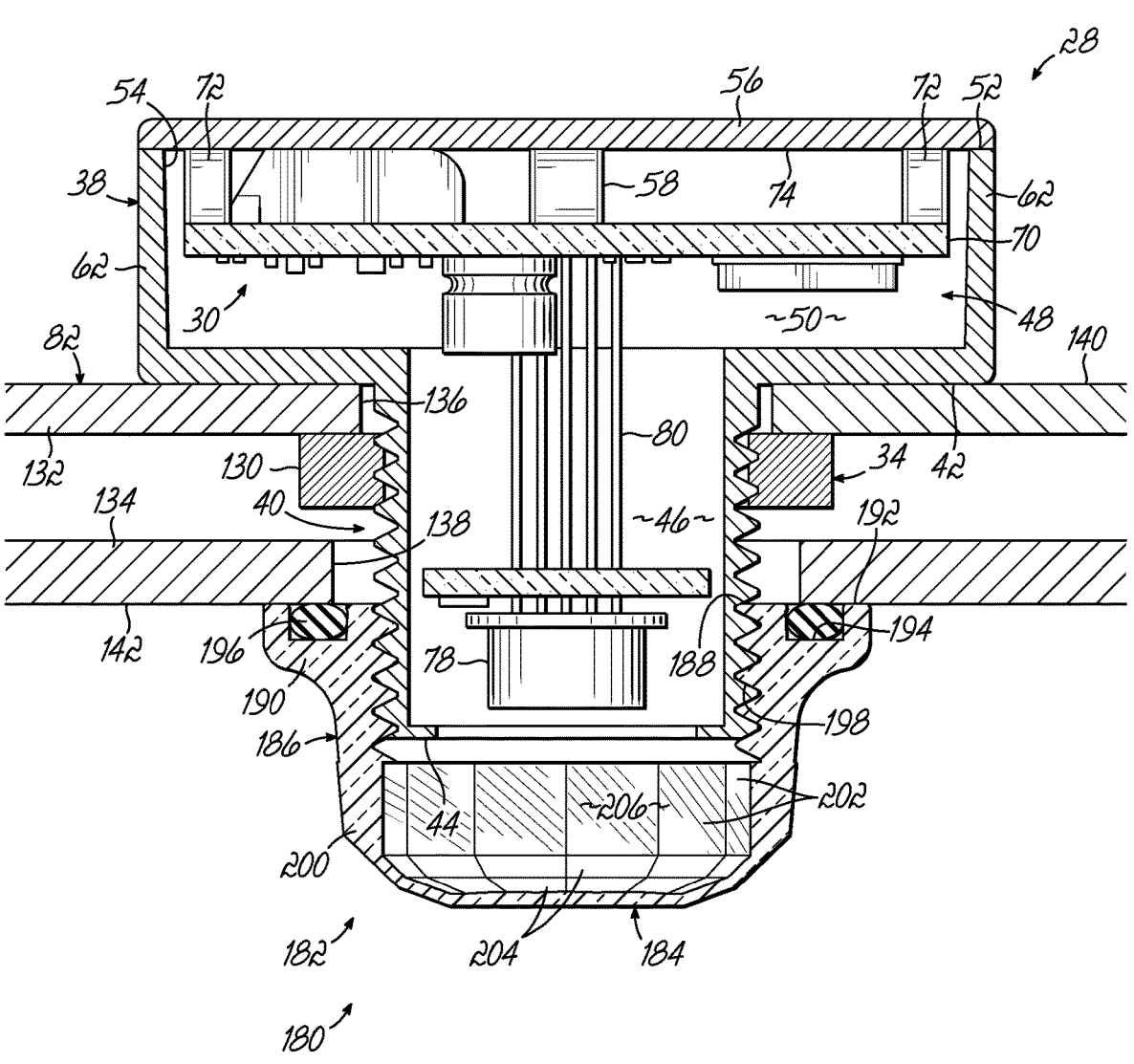
FIG. 8 is a cross-sectional view of the IR sensor assembly of FIG. 7, illustrating the IR sensor assembly mounted to a double-walled substrate according to an embodiment of the present invention.

Referring now to FIGS. 7 and 8, wherein like numerals represent like features compared to embodiments described above with respect to FIGS. 1-4, an IR sensor assembly 180 is shown and will now be described in accordance with another embodiment of the present invention. The primary differences between the IR sensor assembly 180 of this embodiment and the IR sensor assembly 12 of the previously described embodiments is that the IR sensor assembly 180 includes a lens 182 rather than a lens assembly 26. Accordingly, the lens 182 will be the focus of the following description.

FIG. 7 illustrates the IR sensor assembly 180 mounted to a substrate, which may be the cover 20 of the of the luminaire assembly 10 described above. In particular, the IR sensor assembly 180 is mounted to the cover 20 of the luminaire assembly 10, adjacent to the optical frame 18 and the light source 22. As shown, the IR sensor assembly 180 is mounted to the cover 20 such that the lens 182 of the IR sensor assembly 180 remains exposed from the interior of the luminaire assembly 10.

Referring now to FIGS. 7 and 8, the IR sensor assembly 180 includes the housing 28, the IR sensor 30 configured to be received withing the chamber 50 of the housing 28, the internally threaded locking ring 34, and the lens 182 configured to be threadably attached to the tubular connector 40 of the housing 28. The lens 182 is configured to focus the incoming IR radiation onto the IR sensing element 78 of the IR sensor 30 to improve the sensitivity of the IR sensor 30 for a desired lighting application, for example. In that regard, the lens 182 includes a lens portion, being a multi-lens portion 184, and a tubular body 186 that extends a length between the multi-lens portion 184 and an open end 188 of the lens 182. The open end 188 of the lens 182 includes an annular flange 190 that defines a base 192 of the lens 182. Formed in the base 192 is an annular groove 194 that is configured to receive a sealing gasket 196. The sealing gasket 196, which may be an O-ring, is configured to form a seal between the lens 182 and the substrate 82 to which the IR sensor assembly 180 is attached, as shown in FIG. 8.

The tubular body 186 of the lens 182 includes an internally threaded sidewall portion 198 proximate the base 192 of the lens 182 and a non-threaded sidewall portion 200 proximate the multi-lens portion 184. The internally threaded sidewall portion 198 of the tubular body 186 includes at least one internal thread that extends from the base 192 at the open end 188 of the tubular body 186 to the non-threaded sidewall portion 200. In that regard, the at least one internal thread extends continuously for a majority of the length of the tubular body 186, such as 50% or more of the length of the tubular body 186, for example. The non-threaded sidewall portion 200 extends from the threaded sidewall portion 198 to the multi-lens portion 184. The non-threaded sidewall portion 200 of the tubular body 186 includes a plurality of internal facets 202 that are configured to refract and focus incoming IR radiation onto the IR sensing device 78 of the IR sensor 30. Internal surfaces of the tubular body 186 include the plurality of facets 202 which are formed circumferentially about the non-threaded sidewall portion 200 of the tubular body 186. In an alternative embodiment, the internal and external surfaces of the non-threaded sidewall portion 200 of the tubular body 186 may be faceted.

With continued reference to FIGS. 7 and 8, the multi-lens portion 184 includes a plurality of faceted surfaces 204 of different shapes and sizes that, like the internal facets 202 described above, are designed to refract the incoming IR radiation in a way that brings it to a focal point within the lens 182 and onto the IR sensing element 78. To this end, the multi-lens portion 184 and the non-threaded sidewall portion 200 of the tubular body 186 of the lens 182 form an IR receiving chamber 206 through which incoming IR radiation passes to reach the IR sensing element 78 of the IR sensor 30. The lens 182 is formed as a unitary piece and may be formed from optical grade plastic, such as acrylic, polycarbonate, or Polyvinyl chloride (PVC), for example.

FIG. 8 illustrates the IR sensor assembly 180 mounted to the exemplary substrate 82. In that regard, the housing 28 is attached to the inner wall 132 of the substrate 82 with the internally threaded locking ring 34, as shown. Once the housing 28 of the IR sensor assembly 180 has been secured to the inner wall 132 of the substrate 82, the outer wall 134 of the substrate 82 may be moved in place (i.e., the cover 20 secured to the housing 16 of the luminaire assembly 10) such that the exposed portion of the tubular connector 40 is positioned through the opening 138 in the outer wall 134. When so positioned, a portion of the tubular connector 40, and in particular the open end 44 of the tubular connector 40, is exposed from the substrate 82. The lens 182, with the sealing gasket 196 arranged in the annular groove 194, may then be threaded directly to the exposed portion of the tubular connector 40. In that regard, the lens 182 may then be threaded onto the tubular connector 40 until the base 192 of the lens 182 abuts the outer wall 134 of the substrate 82. The threaded engagement between the lens 182 and the tubular connector 40 of the housing 28 compresses the sealing gasket 196 between the flange 190 of the lens 182 and the outer wall 134 of the substrate 82 to form a seal therebetween. The seal formed by the sealing gasket 196 prevents the ingress of contaminates past substrate 82 via the opening 138 in the outer wall 134.

When the IR sensor assembly 180 is assembled to the substrate 82 (e.g., FIG. 8), the lens 182, the tubular connector 40 of the housing 28, and the IR sensing element 78 of the IR sensor 30 are coaxial. In that regard, the lens 182 is configured to focus or direct incoming radiation into the free open end 44 of the tubular connector 40 and onto the IR sensing element 78. As shown, the housing 28 of the IR sensor assembly 180 remains on the first side 140 of the substrate 82 with the lens 182 being located on the second side 142 of the substrate 82. To that end, the body 38 of the housing 28 of the IR sensor assembly 180 may be located in the interior of the luminaire assembly 10 while the lens 182 remains external to the luminaire assembly 10.

Figure 9:
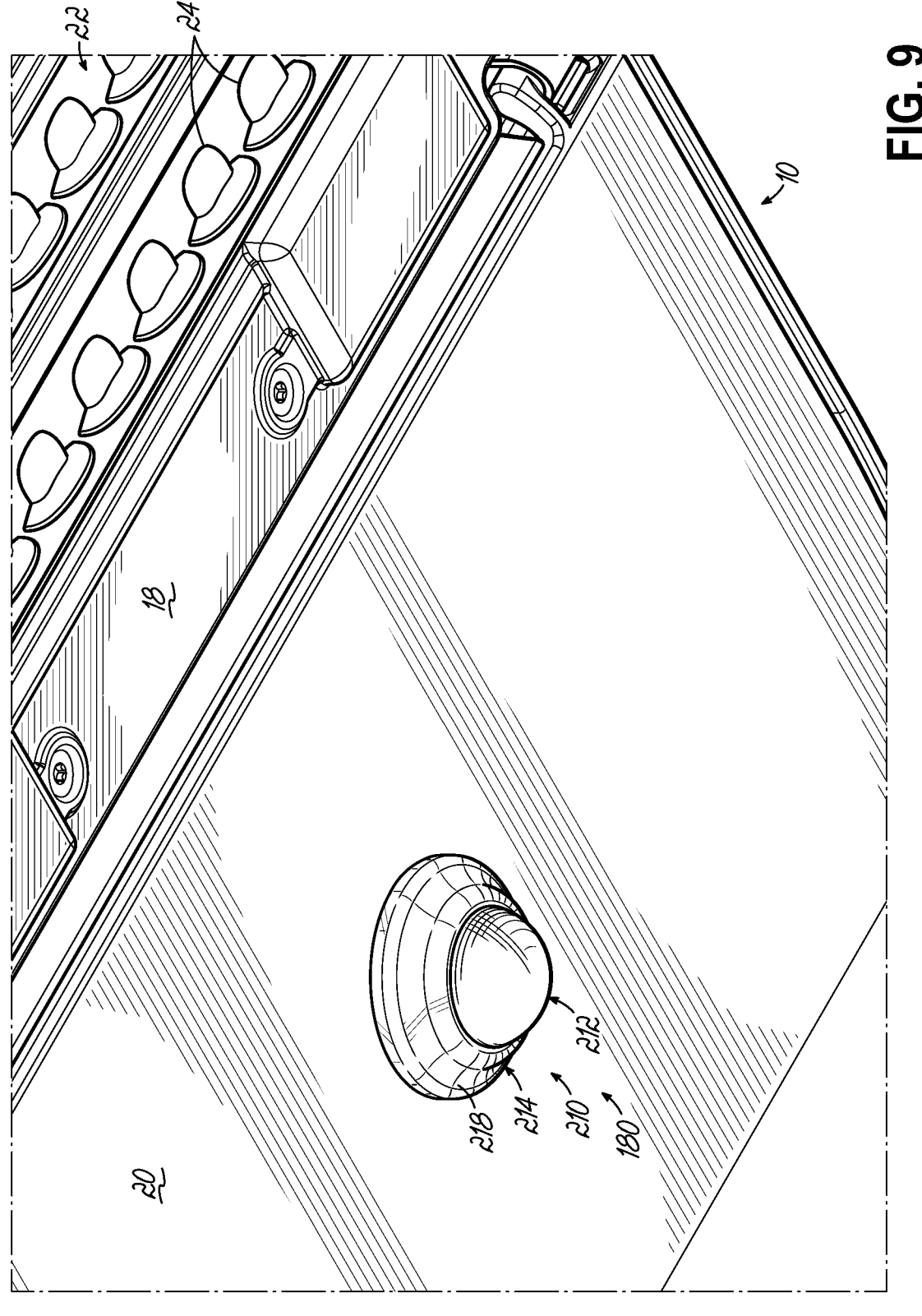
FIG. 9 is a perspective view of an IR sensor assembly according to another embodiment of the present invention, illustrating the IR sensor assembly mounted to the luminaire assembly of FIG. 1.
Figure 10:
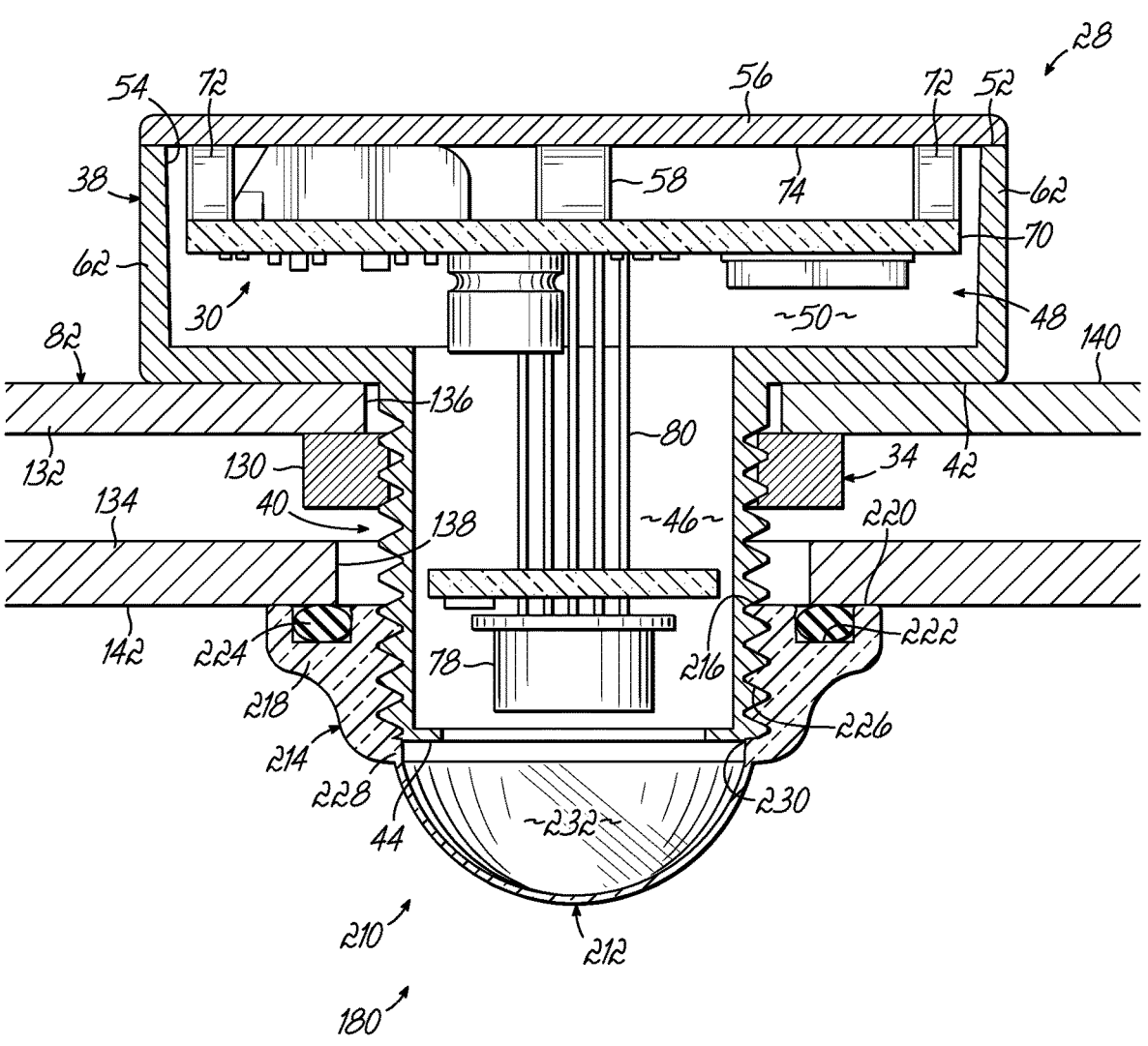
FIG. 10 is a cross-sectional view of the IR sensor assembly of FIG. 9, illustrating the IR sensor assembly mounted to a double-walled substrate according to an embodiment of the present invention.

Referring now to FIGS. 9 and 10, wherein like numerals represent like features compared to embodiments described above with respect to FIGS. 1-8, another embodiment of the IR sensor assembly 180 is shown and will now be described. The primary differences between the IR sensor assembly 180 of this embodiment and the IR sensor assembly 180 of the embodiment described above with respect to FIGS. 7-8 is the configuration of a lens 210. Accordingly, the lens 210 will be the focus of the following description.

FIG. 9 illustrates the IR sensor assembly 180 mounted to a substrate, being housing 16 of the luminaire assembly 10 described above. In particular, the IR sensor assembly 180 is mounted to the cover 20 of the luminaire assembly 10, adjacent to the optical frame 18 and the light source 22. The IR sensor assembly 180 is mounted to the cover 20 such that the lens 210 of the IR sensor assembly 180 remains exposed from the interior of the luminaire assembly 10.

With reference to FIGS. 9 and 10, the lens 210 is threadably attachable to the tubular connector 40 of the housing 28 and is configured to focus the incoming IR radiation onto the IR receiving element 78 of the IR sensor 30 to improve the sensitivity of the IR sensor 30 for a desired lighting application, for example. In that regard, the lens 210 includes a lens portion, being a convex lens portion 212, and a tubular body 214 that extends between the convex lens portion 212 and an open end 216 of the lens 210. The open end 216 of the lens 210 includes an annular flange 218 that defines a base 220 of the lens 210. Formed in the base 220 is an annular groove 222 that is configured to receive a sealing gasket 224. The sealing gasket 224, which may be an O-ring, is configured to form a seal between the lens 210 and the substrate 82 to which the IR sensor assembly 180 is attached, as shown in FIG. 10.

The tubular body 214 of the lens 210 includes an internally threaded sidewall portion 226 proximate the base 220 of the lens 210 and a non-threaded sidewall portion 228 proximate the multi-lens portion 212. The internally threaded sidewall portion 226 and the non-threaded sidewall portion 228 may be separated by an annular ledge 230 that is configured to abut the free open end 44 of the tubular connector 40 when the lens 210 is threadably attached thereto. The internally threaded sidewall portion 226 of the tubular body 214 includes at least one internal thread that extends from the base 220 at the open end 216 of the tubular body 214 to the non-threaded sidewall portion 226. In that regard, the at least one internal thread extends continuously for a majority of the length of the tubular body 214, such as 90% or more of the length of the tubular body 214, for example.

The convex lens portion 212 is defined by a smoothly curved or arcuate surface that is configured to refract the incoming IR radiation in a way that brings it to a focal point within the lens 210 and onto the IR sensing element 78. To this end, the convex lens portion 212 and the non-threaded sidewall portion 228 of the tubular body 214 of the lens 210 form an IR receiving chamber 232 through which incoming IR radiation passes to reach the IR sensing element 78 of the IR sensor 30. The lens 210 is formed as a unitary piece and may be formed from optical grade plastic, such as acrylic, polycarbonate, or Polyvinyl chloride (PVC), for example.

FIG. 10 illustrates the IR sensor assembly 180 mounted to the exemplary substrate 82. The housing 28 is mounted to the substrate 82 in the same manner as described above with respect to FIGS. 7-8, for example. The lens 210, with the sealing gasket 224 arranged in the annular groove 222, may then be threaded directly to the portion of the tubular connector 40 that is exposed from the substrate 82. In that regard, the lens 210 is then threaded onto the tubular connector 40 until the base 220 of the lens 210 abuts the outer wall 134 of the substrate 82. When so positioned, the tubular connector 40 may abut the annular ledge 230. The threaded engagement between the lens 210 and the tubular connector 40 of the housing 28 compresses the sealing gasket 224 between the flange 218 of the lens 210 and the outer wall 134 of the substrate 82 to form a seal therebetween. The seal formed by the sealing gasket 224 prevents the ingress of contaminates past the substrate 82 via the opening 138 in the outer wall 134. To this end, when the IR sensor assembly 180 is assembled to the substrate 82 (e.g., FIG. 10), the lens 210, the tubular connector 40 of the housing 28, and the IR sensing element 78 of the IR sensor 30 are coaxial. Further, the housing 28 of the IR sensor assembly 180 remains on the first side 140 of the substrate 82 with the lens 210 being located on the second side 142 of the substrate. To that end, the body 38 of the housing 28 of the IR sensor assembly 180 may be located in the interior of the luminaire assembly 10 while the lens 210 remains external to the luminaire assembly 10.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. An infrared sensor assembly configured to be mounted to a substrate, the infrared sensor assembly comprising:
   a housing that defines a chamber configured to receive an infrared sensor therein, the housing comprising:
   a body; and
   a tubular connector projecting from the body to a free open end of the tubular connector, the tubular connector including at least one external thread that extends proximate to the free open end;
   a lens assembly threadably attached to the tubular connector, the lens assembly including a base having an annular groove;
   a gasket received within the annular groove of the lens assembly; and
   an internally threaded locking ring that is configured to be threadably received by the tubular connector to secure the infrared sensor assembly to the substrate;
   wherein the substrate is configured to be positioned between the threaded locking ring and the lens assembly such that the gasket is compressed between the substrate and the lens assembly to form a seal therebetween.

2. The infrared sensor assembly of claim 1, wherein the at least one external thread of the tubular connector extends to the free open end.

3. The infrared sensor assembly of claim 1, wherein the at least one external thread of the tubular connector extends continuously between the body of the housing and the free open end of the tubular connector.

4. The infrared sensor assembly of claim 1, wherein the body of the housing includes a back cover removably attached to a back of the body to provide access to the chamber of the housing.

5. The infrared sensor assembly of claim 1, wherein the body is configured to house a printed circuit board of the infrared sensor and the tubular connector is configured to house an infrared sensing element of the infrared sensor.

6. The infrared sensor assembly of claim 1, wherein the lens assembly comprises:
   a lens including a tubular body that extends between a lens portion and an open end to define an infrared receiving chamber, the tubular body including an external sidewall with at least one external thread that extends proximate to the open end of the tubular body; and
   a lens housing including a first internally threaded socket being configured to threadably receive the lens and a second internally threaded socket being configured to threadably receive the tubular connector of the infrared sensor assembly housing.

7. The infrared sensor assembly of claim 6, wherein the lens assembly further includes a gasket located between a base of the first internally threaded socket and the open end of the lens to form a seal therebetween.

8. The infrared sensor assembly of claim 6, wherein the lens housing includes a tubular body with the first internally threaded socket formed in the tubular body at a top of the lens housing and the second internally threaded socket formed in a base of the lens housing, and an opening formed in the tubular body that places the first internally threaded socket in communication with the second internally threaded socket.

9. The infrared sensor assembly of claim 8, wherein the opening formed in the tubular body of the lens housing defines an annular ledge that is configured to abut the free open end of the tubular connector when the lens housing is threadably attached thereto.

10. An infrared sensor assembly configured to be mounted to a substrate, the infrared sensor assembly comprising:

a housing that defines a chamber configured to receive an infrared sensor therein, the housing comprising:

a body; and a tubular connector projecting from the body to a free open end of the tubular connector, the tubular connector including at least one external thread that extends proximate to the free open end;

a lens threadably attached to the tubular connector, the lens including a base having an annular groove;

a gasket received within the annular groove of the lens; and an internally threaded locking ring that is configured to be threadably received by the tubular connector to secure the infrared sensor assembly to the substrate;

wherein the lens is configured to engage the substrate such that the gasket is compressed between the substrate and the lens assembly to form a seal therebetween.

11. The infrared sensor assembly of claim 10, wherein the at least one external thread of the tubular connector extends to the free open end.

12. The infrared sensor assembly of claim 10, wherein the at least one external thread of the tubular connector extends continuously between the body of the housing and the free open end of the tubular connector.

13. The infrared sensor assembly of claim 10, wherein the body of the housing includes a back cover removably attached to a back of the body to provide access to the chamber of the housing.

14. The infrared sensor assembly of claim 10, wherein the body is configured to house a printed circuit board of the infrared sensor and the tubular connector is configured to house an infrared sensing element of the infrared sensor.

15. The infrared sensor assembly of claim 1, wherein the lens includes a lens portion and a tubular body that extends between the lens portion and an open end of the lens.

16. The infrared sensor assembly of claim 15, wherein the tubular body includes an internally threaded sidewall portion having at least one internal thread that terminates proximate to the open end of the tubular body, the at least one internal thread being configured to threadably engage the tubular connector.

17. The infrared sensor assembly of claim 16, wherein the tubular body includes a non-threaded sidewall portion that extends between the internally threaded sidewall portion of the tubular body and the lens portion.

18. The infrared sensor assembly of claim 17, wherein the internally threaded sidewall portion and the non-threaded sidewall portion are separated by an annular ledge that is configured to abut the free open end of the tubular connector.

19. The infrared sensor assembly of claim 17, wherein the non-threaded sidewall portion includes a plurality of internal facets formed circumferentially about the non-threaded sidewall portion.

20. The infrared sensor of claim 15, wherein the lens portion comprises a multi-lens portion including a plurality of faceted surfaces.

21. The infrared sensor of claim 15, wherein the lens portion comprises a convex lens portion including a smoothly curved surface.

* * * * *